（12）United States Patent
Baird et al.

(10) Patent No.: US 8,422,982 B2
(45) Date of Patent: Apr. 16, 2013

(54) METHOD AND APPARATUS FOR DC POWER MANAGEMENT WITHIN MULTI-CHANNEL LNBF

(75) Inventors: Andrew Baird, Bramley (GB); Jonathan Walker, Ham (GB)

(73) Assignee: Raven NC LLC, Smithfield, NC (US)

( * ) Notice: Subject to any disclaimer, the term of this patent is extended or adjusted under 35 U.S.C. 154(b) by 1434 days.

(21) Appl. No.: 11/277,404

(22) Filed: Mar. 24, 2006

(65) Prior Publication Data

US 2007/0079338 A1 Apr. 5, 2007

Related U.S. Application Data

(60) Provisional application No. 60/596,543, filed on Oct. 3, 2005.

(51) Int. Cl.
H04B 1/16 (2006.01)

(52) U.S. Cl.
USPC ............ 455/343.1; 455/343.2; 455/343.3; 455/343.4; 455/343.5; 725/68; 725/63; 725/64; 725/65

(58) Field of Classification Search ............... 455/343.1, 455/127.1, 127.5, 343.2–343.6, 67.11–67.13, 455/572, 3.02, 275, 334, 7, 9, 522, 12.1; 379/93.02; 725/71, 68, 150, 63–65, 67, 69, 725/70, 72, 78
See application file for complete search history.

(56) References Cited

U.S. PATENT DOCUMENTS

| | | | |
|---|---|---|---|
| 5,959,592 A * | 9/1999 | Petruzzelli | 725/68 |
| 6,256,483 B1 | 7/2001 | Moerder et al. | |
| 6,430,233 B1 | 8/2002 | Dillon et al. | |
| 6,556,807 B1 | 4/2003 | Horie et al. | |
| 6,771,930 B2 | 8/2004 | Buer | |
| 6,832,071 B1 * | 12/2004 | Nakamura et al. | 455/3.02 |
| 6,944,878 B1 * | 9/2005 | Wetzel et al. | 725/72 |
| 6,996,389 B2 * | 2/2006 | Fitzpatrick et al. | 455/343.1 |
| 7,130,576 B1 * | 10/2006 | Gurantz et al. | 455/3.02 |
| 7,136,618 B2 * | 11/2006 | Kato et al. | 455/3.02 |
| 7,149,470 B1 * | 12/2006 | Shah et al. | 455/3.02 |
| 7,203,457 B1 * | 4/2007 | Wetzel | 455/3.02 |
| 2002/0044094 A1 * | 4/2002 | May | 343/703 |
| 2004/0028149 A1 * | 2/2004 | Krafft et al. | 375/316 |
| 2004/0057565 A1 * | 3/2004 | Jones | 379/93.02 |
| 2004/0060065 A1 * | 3/2004 | James et al. | 725/71 |
| 2005/0066367 A1 * | 3/2005 | Fyke et al. | 725/68 |

* cited by examiner

*Primary Examiner* — Tuan Pham
(74) *Attorney, Agent, or Firm* — Babcock IP, PLLC

(57) ABSTRACT

A method and apparatus for energizing a multi-channel LNBF containing multiple LNB(s) the LNBF connected to multiple IRDs. The number of IRDs present is detected. If more than one IRD is present, all LNBs are energized. If only one IRD is detected, power sufficient to supply the LNB the IRD has selected is supplied. Identification of which LNB the single IRD has selected may be determined by monitoring the presence of a desired voltage, frequency tone, and or series of frequency tones.

20 Claims, 2 Drawing Sheets

METHOD AND APPARATUS FOR DC POWER MANAGEMENT WITHIN MULTI-CHANNEL LNBF

CROSS REFERENCE TO RELATED APPLICATION

This application claims the benefit of U.S. Provisional Patent Application No. 60/596,543 "Method and Apparatus for Multi-Channel LNBF Power Management" by Andrew Baird and Jonathan Walker, filed Oct. 3, 2005.

DESCRIPTION

1. Field of the Invention

The present invention relates to power management within a satellite ground station. More particularly, the invention relates to circuit switching for a multi-channel satellite ground station feeding multiple Integrated Receiver Decoders (IRD) to improve energy efficiency without causing signal interference.

2. Background

Satellite communication systems are known and generally well understood. Ground stations are used for the communication of data, voice and video signals. Because of the volume of signal traffic typically processed by ground stations, signal traffic may be divided among several separate carrier signals.

A ground station may include a receiver and or transceiver, antenna (placed outdoors in direct line of sight with the satellite) and an interface unit. The interface unit is typically placed indoors and functions to interface the receiver and or transceiver with end-user equipment.

The antenna assembly typically includes an LNB (Low Noise Block Downconverter), which is a combination Low Noise Amplifier and downconverter built into one device attached to the antenna feed. A block converter simultaneously converts the entire frequencies of one polarity received by the antenna to a lower frequency.

Satellite television typically delivers multiple channels of programming received from a single or multiple satellites by a ground station antenna, such as a reflector antenna, with a multi channel LNBF (Low Noise Block Converter integrated with a Feed). Within a multi channel LNBF there are multiple LNB circuits. A multi channel LNBF may be connected to multiple interface units, for example, four (4) Integrated Receiver Decoders (IRD) which will supply 4 separate devices, such as televisions, each of which may be switched independently between all channels that are available, the different channels divided up into groups between the different LNB(s).

A Field Effect Transistor (FET) amplifier at the front of each LNB, by its nature may exhibit spurious oscillations during power up. To prevent signal interference from one LNB to another (one channel/television to another) it is known to power up all the FET(s) while the multi channel LNBF is working irrespective of which one is being used. This creates an increased DC power requirement, whether or not each of the available LNB circuits are being utilized. The increased power requirement is particularly wasteful in the common situation where only one IRD is actually connected, as that is when the lowest DC power is required.

In addition, switching circuits within the LNB may pull or push the frequency of the free running oscillators used to downconvert the signals. The pulling occurs when RF circuits connected to the oscillator output are switched on and off. The pushing is caused by small voltage transients on the power supply to the oscillator which occur during the circuit switching. This instantaneous change in frequency can cause the tuner in the IRD to lose lock if the frequency excursion is too great or the speed of the frequency change is too high.

In order to reduce DC power consumption the practice of switching off the LNB circuits that are not being utilized has been used. However, this often creates significant interference problems, including picture breakup on the other IRDs, generated by switching oscillations when the FET amplifiers are powered on/off during a channel change at one IRD.

The increasing competition for reflector antennas adapted for high volume consumer applications such as satellite TV and or internet communications has focused attention on ease of use and cost reductions resulting from increased materials, manufacturing and service efficiencies. Further, reductions in operating power requirements, required assembly operations and the total number of discrete parts are desired.

BRIEF DESCRIPTION OF THE DRAWINGS

The accompanying drawings, which are incorporated in and constitute a part of this specification, illustrate embodiments of the invention and, together with the general and detailed descriptions of the invention appearing herein, serve to explain the principles of the invention.

DETAILED DESCRIPTION

The invention provides an improved method and apparatus for DC power management. By selectively powering LNBs depending upon whether or not more than one of the associated IRD(s) is connected and or energized at least in a standby mode, significant power efficiencies are realized and interference generated for one IRD due to switching occurring according to LNB demand by other IRD(s) is eliminated. The invention may be applied, for example, in any multi channel direct to home (DTH) satellite application.

Figure 1:
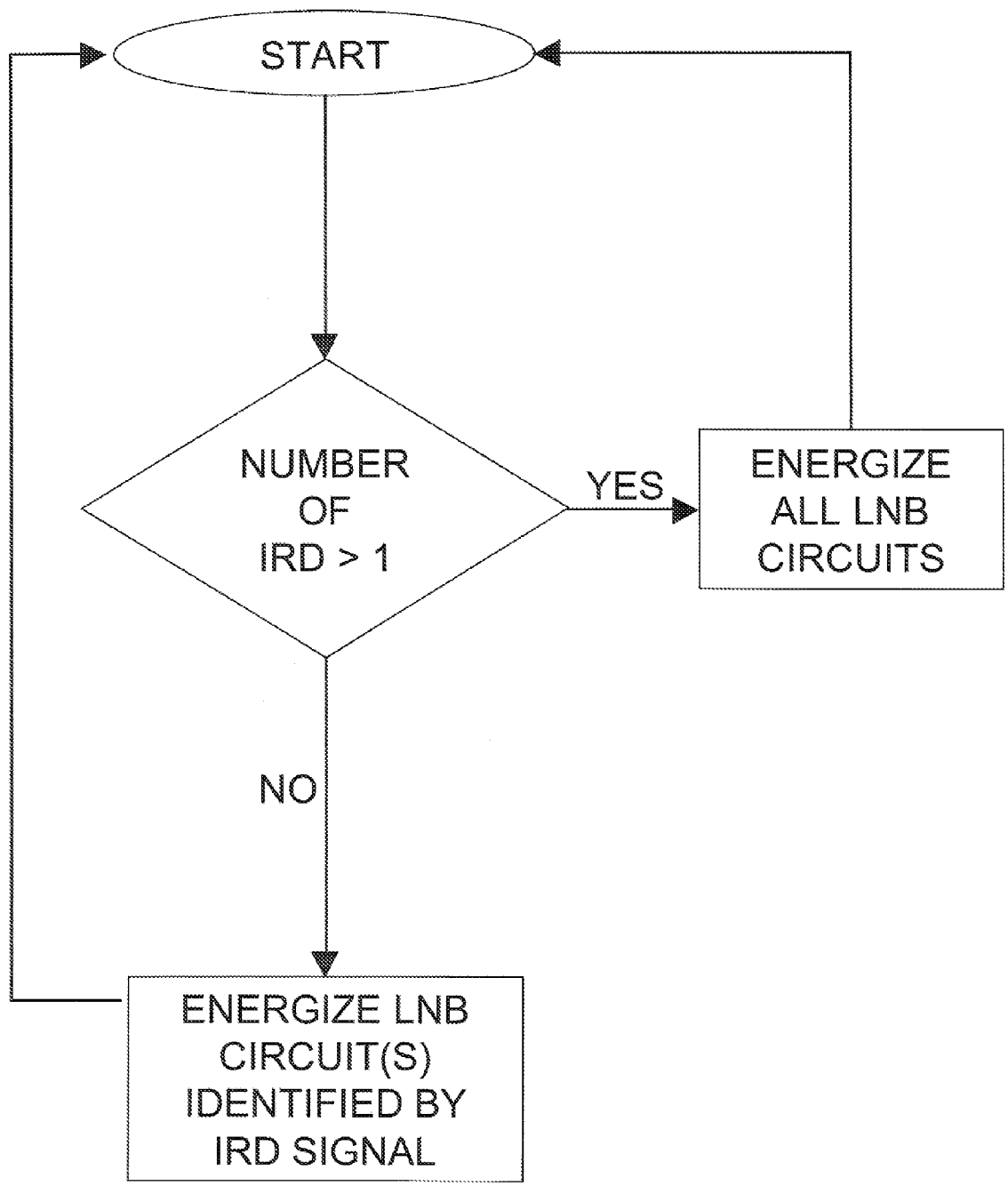
FIG. 1 is a schematic circuit logic diagram of an exemplary embodiment of the invention.

DC power management according to the invention applies a power switching logic, as shown for example in FIG. 1, which will only energize the LNB circuit(s) a single IRD is tuned to. In that instance, by definition there are no other IRD connected that can be affected by switching oscillations. However, when more than one IRD is connected, the power switching logic will recognize the presence of additional IRD(s) and switch on all LNB circuits all the time to eliminate switch on oscillation and LO pulling/pushing problems. The power requirement for the plurality of LNB circuits can easily be met as there is more than one IRD connected.

IRD detection may be performed by a separate circuit having, for example, a plurality of switches equal to the number of IRD ports, a potential divider and a precision voltage monitor with a preset threshold. One of the plurality of switches is linked to each of the IRD ports. When only a single IRD is present, only a single switch is closed, presenting a voltage higher than the voltage threshold to the voltage monitor. A logic level at the voltage monitor output, indicating whether or not more than one IRD is present provides the override signal to the power management circuitry.

When the logic level of the voltage monitor output indicates only a single IRD is connected, the LNB selection decode circuit is enabled, resulting in the selection of only the required LNB circuit(s) depending on an LNB identifier signal from the single IRD. When two or more IRD(s) are connected the switches close and the voltage presented to the voltage monitor falls proportionally to the number of connected IRD(s). The voltage monitor threshold voltage is set so in the presence of two or more operating IRD(s) the internal threshold of the voltage monitor is crossed, changing the state of the logic level at the voltage monitor output. Should the occasion arise where multiple IRD(s) have been in use but suddenly only one IRD remains, the voltage monitoring circuit removes the override and the individual active power management circuits revert back to intelligent switching, de-energizing other than the selected LNB circuit and cutting off unnecessary power supply.

Figure 2:
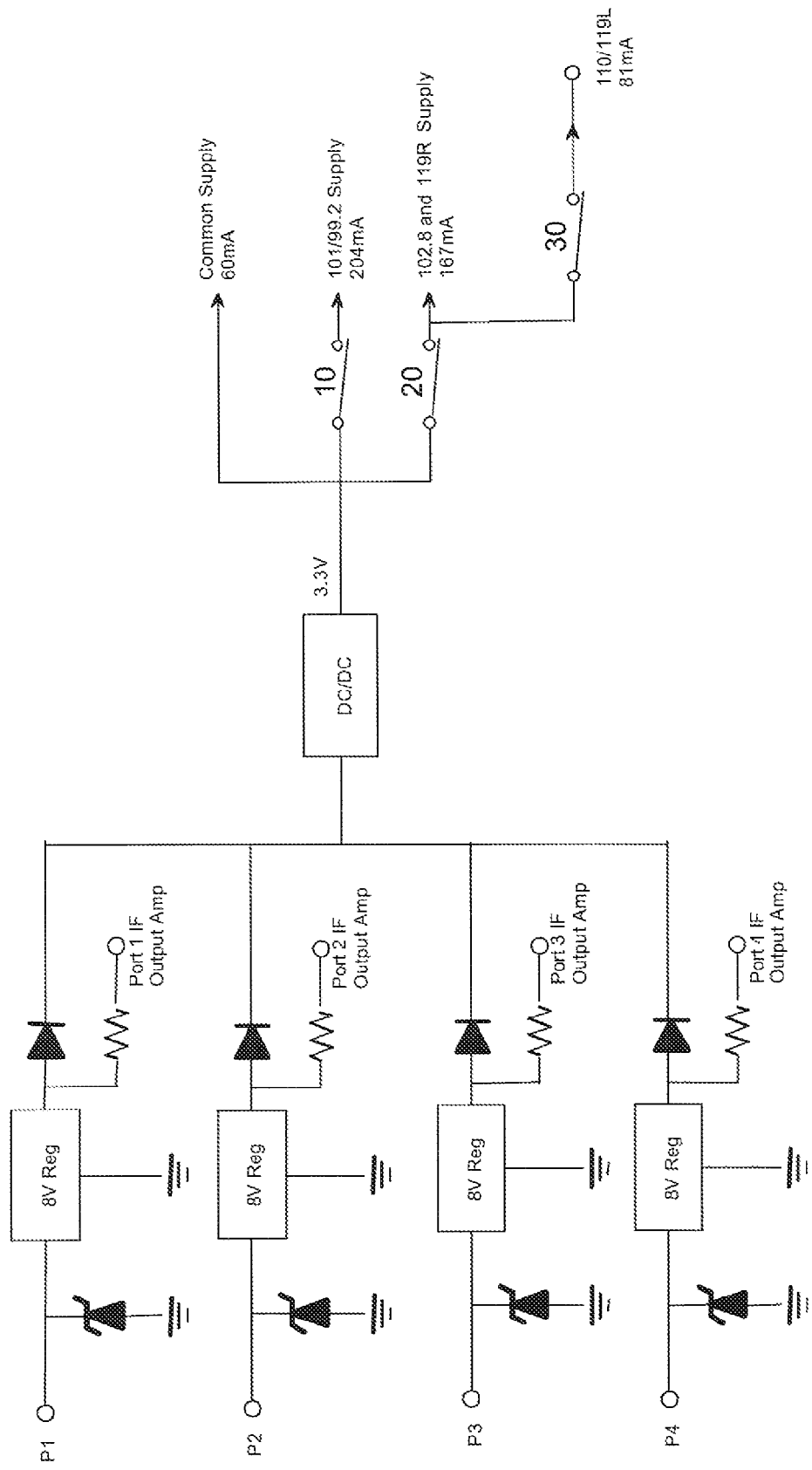
FIG. 2 is a schematic view of an exemplary embodiment of a power management circuit according to the invention, shown applied to a four (4) IRD per LNBF configuration.

Intelligent switching detects an LNB circuit identifier, for example the presence of voltage, specific frequency tone and or tone code on any of the plurality of IRD port(s) from the IRD(s). As shown in FIG. 2, a range of power supply rails and side car supply rails are switched according to the voltage monitor output level and an LNB circuit identifier. In the present embodiment, the specific LNB circuit identifier states of the connected IRD(s) that identify which signal each IRD tuner (P1, P2, P3 and P4) has selected differentiate between channel groups from five separate satellites (99W, 101W, 103W, 110W and 119W), each satellite transmitting in two polarities, LHCP (left hand circular polarity) and RHCP (right hand circular polarity).

The polarity is selected by changing the supply voltage to the LNB and the satellite is selected by superimposing a 22 kHz tone on the supply according to the following scheme:
13V DC: Selects RHCP signals
18V DC: Selects LHCP signals
No 22 kHz tone: selects 99W+101W (Signals are frequency stacked).
22 kHz tone selects: 103W+110W+119W (Signals are frequency stacked)

Therefore, there are 4 possible output states for an LNB selection decode circuit to detect:
1) 13V, No tone (RHCP on 99+101)
2) 18V, No tone (LHCP on 99+101)
3) 13V, Tone (RHCP on 103+110+119)
4) 18V, Tone (LHCP on 103+110+119)

Alternatively, a switching protocol such as DiSEqC that sends serial bursts of data via 22 khz or other designated frequency tone(s) may be applied, the serial data decoded by additional circuitry at the LNB to generate the necessary LNB circuit identifier(s).

A common power supply, for example 60 mA, is always energized and available to the LNB circuits (Port 1-4 IF). To meet the load demands of the possible output states when only a single IRD is present and or to energize all LNB circuits (Port 1-4 IF) when more than one IRD is detected, one or more additional rails of the common power supply and or additional sidecar supply power rails are connected. In the embodiment of FIG. 2, switches 10, 20, and 30 are closed if multiple IRDs are detected. Where only one IRD is detected, one of switch 10 or 20 will be closed depending upon whether or not a 22 kHz tone is present, respectively. Similarly, switch 30 is closed if one IRD is detected and a 22 kHz tone is present. Thereby, the current drawn from a single IRD is not higher than required and overall current consumed is minimized according to the specific state, i.e. LNB circuit in use. Where multiple IRD(s) are detected, the switching logic is effectively disabled and suitable power supply to drive all LNB circuits connected, that in addition to power from the minimum of two IRD(s) that are connected, meets the worst case power demands. A DC/DC converter may be placed in-line with the common power supply and or one or more of the additional power supply rails to minimize current draw.

Where prior "energy efficient" LNB power supply switching circuits applied suitable power for the state(s) of the IRD(s) (channel selection), when one of the IRD(s) has a channel change that requires the de-energizing and or energizing of additional LNB circuit(s), unacceptable interference was created with respect to the other IRD(s). The present invention eliminates this situation, because the DC power management is overridden, i.e. switched off, when more than one IRD is present. By the present invention, the common situation where one IRD is present is handled with high energy efficiency by connecting the exact level of power required. In addition, optimum performance is achieved where multiple IRD(s) are connected because with each of the LNB circuits always energized, the potential for switching interference is eliminated.

One skilled in the art will recognize that, while the present invention has been demonstrated with respect to a specific four (4) IRD/LNBF embodiment, the invention is equally applicable to any number of multiple IRD and LNBF requirements. The switching means described may be implemented in analog and or digital embodiments using discrete circuit links to individual switches or a centralized detection, decoding and or logical control. Also, the multiple states may have different specific power requirement(s) and or desired detection/switching points.

Where in the foregoing description reference has been made to ratios, integers, components or modules having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

What is claimed is:

1. A method for energizing a multi-channel Low Noise Block Converter integrated with a Feed containing multiple Low Noise Block Converter circuits, the Low Noise Block Converter integrated with a Feed connectable to multiple Integrated Receiver Decoders, comprising the steps of:
   detecting the number of Integrated Receiver Decoders present;
   energizing all of the Low Noise Block Converter circuits when more than one Integrated Receiver Decoder is detected such that the Low Noise Block Converter circuits are not energized individually selectively; and
   energizing one Low Noise Block Converter circuit when only a single Integrated Receiver Decoder is detected, by detecting the presence or not of a frequency tone and detecting the level of the voltage supply and selecting the single Low Noise Block Converter circuit which is to be energized by using an Low Noise Block Converter selection decode circuit to operate said one selected Low Noise Block Converter circuit.

2. The method of claim 1, further including, where a single Integrated Receiver Decoder is detected, logically determining the selected Low Noise Block Converter circuit that the single Integrated Receiver Decoder has selected, and connecting a predetermined power level associated with the selected Low Noise Block Converter circuit.

3. The method of claim 2, wherein the logically determining step is detecting the presence of a voltage level.

4. The method of claim 2, wherein the logically determining step is detecting the presence of a frequency tone.

5. The method of claim 2, wherein the logically determining step is detecting the presence of a voltage level and a frequency tone.

6. The method of claim 2, wherein the logically determining step is decoding a series of frequency tones.

7. The method of claim 2, wherein the predetermined power level is supplied by one or more rails of a sidecar supply.

8. The method of claim 1, further including positioning a DC/DC converter inline with a power supply.

9. A power management circuit for energizing a multi-channel Low Noise Block Converter integrated with a Feed containing multiple Low Noise Block Converter circuits, the Low Noise Block Converter integrated with a Feed connectable to multiple Integrated Receiver Decoders, comprising:
   a plurality of power sources; and
   the plurality of power sources operable to power the Low Noise Block Converter circuits;
   an Integrated Receiver Decoder detection circuit detecting the number of Integrated Receiver Decoders present;
   1) when only a single Integrated Receiver Decoder is detected, engaging a desired power source to an identified Low Noise Block Converter circuit according to an Low Noise Block Converter identifier signal from the single Integrated Receiver Decoder by detecting whether the identifier signal includes a frequency tone and the detection of the level of the voltage supply and wherein
   2) when more than one Integrated Receiver Decoder is detected, engaging of the plurality of power sources to all of the Low Noise Block Converter circuits such that the Low Noise Block Converter circuits are not energized selectively.

10. The power management circuit of claim 9, wherein the Low Noise Block Converter identifier signal is detected by a voltage level monitor to determine the polarity of the signal.

11. The power management circuit of claim 9, wherein the Low Noise Block Converter identifier signal is detected by a frequency tone monitor to determine the satellite with which the identified Low Noise Block Converter is to operate.

12. The power management circuit of claim 9, wherein the Low Noise Block Converter identifier signal is decoded from a series of frequency tones.

13. The power management circuit of claim 9, wherein the Low Noise Block Converter identifier signal is detected by a voltage level monitor and a frequency tone monitor.

14. The power management circuit of claim 9, further including a DC/DC converter positioned inline with at least one of the power sources.

15. A power management circuit for energizing a multi-channel Low Noise Block Converter integrated with a Feed containing multiple Low Noise Block Converter circuits, the Low Noise Block Converter integrated with a Feed connectable to multiple Integrated Receiver Decoders, comprising:
   an IRD detection circuit with a logical output indicating when the number of Integrated Receiver Decoders is detected; and
   an Integrated Receiver Decoder selection decode circuit that,
   1) when the logical output indicates one Integrated Receiver Decoder is detected, senses an Low Noise Block Converter identifier signal of the single Integrated Receiver Decoder and energizes the selected Low Noise Block Converter circuit with a preselected power level with reference to the presence or not of a frequency tone in the identifier signal and the voltage level, and
   2) when the logical output indicates more than one Integrated Receiver Decoder is detected, energizes all Low Noise Block Converter circuits such that the Low Noise Block Converter circuits are not energized individually selectively.

16. The power management circuit of claim 15, wherein the Low Noise Block Converter identifier signal is sensed by a voltage level monitor to determine the polarity of the signal.

17. The power management circuit of claim 15, wherein the Low Noise Block Converter identifier signal is sensed by a frequency tone monitor to determine the satellite with which the identified Low Noise Block Converter is to operate.

18. The power management circuit of claim 15, wherein the Low Noise Block Converter identifier signal is sensed by a voltage level monitor and a frequency tone monitor.

19. The power management circuit of claim 15, further including a DC/DC converter positioned inline with at least one of the power sources.

20. The power management circuit of claim 15, wherein the Low Noise Block Converter identifier signal is sensed by a tone monitor that decodes a series of frequency tones.

* * * * *